(12) United States Patent  (10) Patent No.: US 8,192,170 B2
Rohden  (45) Date of Patent: Jun. 5, 2012

(54) ROTOR BLADE FOR A WIND ENERGY INSTALLATION

(75) Inventor: Rolf Rohden, Aurich (DE)

(73) Assignee: Aloys Wobben, Aurich (DE)

( * ) Notice: Subject to any disclaimer, the term of this patent is extended or adjusted under 35 U.S.C. 154(b) by 504 days.

(21) Appl. No.: 12/299,904

(22) PCT Filed: May 10, 2007

(86) PCT No.: PCT/EP2007/054533
§ 371 (c)(1),
(2), (4) Date: Apr. 17, 2009

(87) PCT Pub. No.: WO2007/131937
PCT Pub. Date: Nov. 22, 2007

(65) Prior Publication Data
US 2009/0311106 A1    Dec. 17, 2009

(30) Foreign Application Priority Data
May 11, 2006  (DE) .......................... 10 2006 022 279

(51) Int. Cl.
*F03B 3/12* (2006.01)
*B63H 1/20* (2006.01)
*B63C 11/04* (2006.01)

(52) U.S. Cl. ........................................ 416/230; 416/248

(58) Field of Classification Search ............... 415/4.1, 415/182.1, 174.2; 416/241 A, 134 A, 230, 416/241 R, 248; 290/44, 54, 55
See application file for complete search history.

(56) References Cited

U.S. PATENT DOCUMENTS

| 2,647,586 | A |  | 8/1953 | Gruetjen |
|---|---|---|---|---|
| 3,674,379 | A | * | 7/1972 | Monti ............................ 416/226 |
| 4,389,162 | A |  | 6/1983 | Doellinger et al. ............ 416/225 |
| 4,412,784 | A | * | 11/1983 | Wackerle et al. .............. 416/230 |
| 4,995,788 | A | * | 2/1991 | Turnberg ....................... 416/230 |
| 5,320,491 | A |  | 6/1994 | Coleman et al. ................ 416/24 |
| 6,179,565 | B1 | * | 1/2001 | Palumbo et al. ............ 416/97 R |
| 6,371,730 | B1 | * | 4/2002 | Wobben .................... 416/244 R |
| 2004/0105752 | A1 | * | 6/2004 | Wobben ........................... 415/4.1 |
| 2005/0180853 | A1 | * | 8/2005 | Grabau et al. ............ 416/241 R |

FOREIGN PATENT DOCUMENTS

| DE | 19962989 | A1 | 7/2001 |
|---|---|---|---|
| DE | 10152449 | A1 | 5/2003 |
| DE | 20320714 | U1 | 1/2005 |
| EP | 0258926 | A1 | 3/1988 |
| EP | 1184566 | A1 | 3/2002 |
| WO | 0146582 | A2 | 6/2001 |
| WO | 03/078833 | A1 | 9/2003 |

* cited by examiner

*Primary Examiner* — Thomas L Dickey
*Assistant Examiner* — Nikolay Yushin
(74) *Attorney, Agent, or Firm* — Seed IP Law Group PLLC

(57) ABSTRACT

A rotor blade for a wind power installation, has at least a first component and a second component. The first component has a rotor blade tip and the second component has a rotor blade root. The first and second components are in the form of separate parts for jointly forming the rotor blade. The first component is of at least a first material and the second component is of at least a second material.

13 Claims, 4 Drawing Sheets

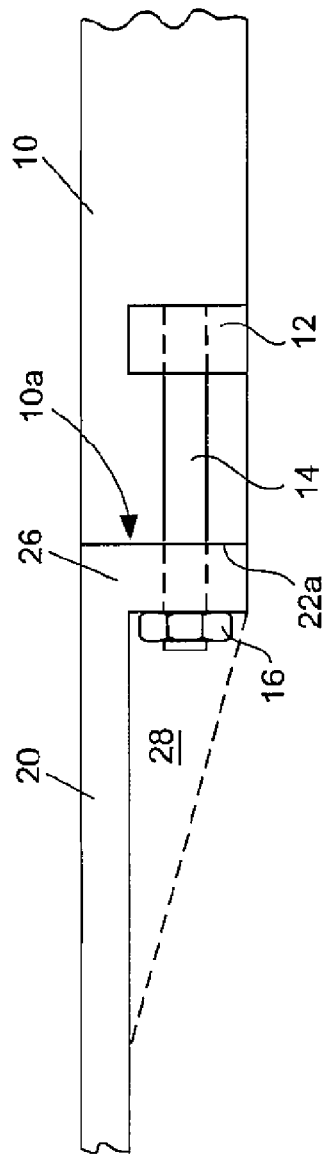

ROTOR BLADE FOR A WIND ENERGY INSTALLATION

BACKGROUND

1. Technical Field

The present invention concerns a rotor blade for a wind power installation, wherein the rotor blade has at least a first component and a second component, and wherein the first component has a rotor blade tip and the second component has a rotor blade root.

2. Description of the Related Art

A divided rotor blade is known for example from German Patent Publication No. DE 199 62 989 A1. The parts of that known rotor blade are produced and transported separately because of the considerable dimensions in order thereby to limit the demands on the infrastructure both in manufacture and also upon transport.

As general further state of the art, attention is directed to German Patent Publication Nos. DE 101 52 449 A1 and DE 203 20 714 U1 and International Publication No. WO 03/078833 A1.

BRIEF SUMMARY

The object of the present invention is to further optimize a rotor blade for a wind power installation by the use of at least a first material for a first component of a rotor blade and at least a second material for a second component of the rotor blade. Thus there is provided a rotor blade for a wind power installation having at least a first component and a second component. The first component has a rotor blade tip and the second component has a rotor blade root. The first and the second components are in the form of separate parts in order to jointly form the rotor blade. The first component has at least a first material and the second component has at least a second material.

In that respect the invention is based on the realization that dividing the rotor blade admittedly makes it possible to reduce the dimensions of the parts to be handled, but that a choice of suitable materials and production processes linked thereto also advantageously influence economy and that this is to be attributed to a number of factors. The reduction in the dimensions of the individual parts also reduce the demands imposed on infrastructure and logistics in manufacture, and handling and transport of the rotor blades to the point of assembly on the wind power installation. The infrastructure, however, is also dependent on the material to be processed, for pre-processing and post-processing steps are required prior to and after the pure shaping operation, depending on the respective material involved. These are, for example, cutting to size and burr removal in metal machining. When processing fiber-reinforced plastic materials such steps include complying with predetermined thermal demands, for example in heat treatment operations and so forth.

While the state of the art admittedly already describes multi-part rotor blades, the shaping parts of which, over the entire rotor blade length, are always made from the same material, the invention proposes the use of different materials which can be advantageously matched to the primary function of a particular component. That specifically targeted choice of material leads for example to a material with a comparatively high modulus of elasticity for a region which is subjected to the effect of high loads, and a material of low inherent weight for rotor blade parts where those high loads do not occur or are lower.

In accordance with the state of the art, light material with a comparatively low modulus of elasticity would otherwise be used, for example, even where it is necessary to ensure a high level of load transfer. Accordingly, a correspondingly large amount of material has to be installed there (considerably more than is required solely for achieving accuracy in respect of shape) in order to guarantee secure load transfer. That considerable amount of material can be saved by a selection in accordance with aspects of the present invention of another material with a higher modulus of elasticity.

In a preferred embodiment of the rotor blade, the second component is in turn divided into at least two parts which jointly form the second component. The second component is particularly preferably divided in that fashion into a load-bearing part and a blade trailing edge box. Handling of large rotor blade components can be further facilitated by that division and in particular on-road transport is in that way simplified quite a bit for rotor blades are of the greatest depth in the region of the second component and can easily attain dimensions of more than 6 m. Accordingly, any tight highway curve and any bridge represents a potential obstacle with corresponding problems which can be reduced, if not even avoided, by dividing the second component into at least two parts. In that respect, in a particularly preferred embodiment, different materials are in turn used for the two parts which jointly form the second component.

In order to still further facilitate the implementation of transport tasks, the blade trailing edge box is, if necessary, divided into a plurality of parts so that it is possible in that way to manufacture and transport rotor blades of any dimensions.

In order to arrive at a particularly advantageous division of the rotor blade into the two components, the first component is preferably of a length of about $5/6$ to $1/2$ of the length of the total rotor blade while the length of the second component preferably corresponds to $1/6$ to $1/2$ of the rotor blade length, respectively.

The blade trailing edge box or parts thereof can be made, for example, from aluminum. Aluminum is light, it can be well shaped, and involves a temperature characteristic similar to steel. Therefore, with a combination of an aluminum trailing edge box and a load-bearing part of steel, the expectation is for a rotor blade which can be relatively inexpensively manufactured with adequate accuracy in respect of shape. In addition, the modulus of elasticity of aluminum is smaller approximately by a factor of 5 than that of steel. That provides, inter alia, that loads to which the second component is subjected are not carried by the softer material of the trailing edge box. The dimensioning of the parts of the trailing edge box can in turn be effected in a correspondingly more advantageous fashion.

In order to facilitate fitment of the blade by assembly of the individual parts and also in subsequent operation inspection of the rotor blade and in particular checking of the transition between the first and second components, in a particularly preferred embodiment, the load-bearing part of the second component is adapted to be negotiable on foot. That signifies on the one hand that the interior affords sufficient space and furthermore that the material is sufficiently capable of bearing a load such that at least no permanent deformation occurs.

The connection between the first and second components of the rotor blade is particularly preferably effected with a butt joint, wherein connecting elements for bridging over the joint (for example, over a gap of the joint) are arranged exclusively within the rotor blade. That imparts an aerodynamically clean external contour to the blade. In that respect the connection is preferably such that the connecting elements include cross-bolts, tie elements and on the second component an L-flange directed inwardly of the rotor blade, wherein the cross-bolts are accommodated in openings in the first component.

In a preferred embodiment, the openings in the first component are in the form of through holes. To provide an aerodynamically smooth rotor blade surface the holes are appropriately covered over. That can be effected by means of prefabricated covers with which the hole is covered over from the exterior. It will be appreciated that that function can also be implemented when processing the rotor blade surface by the application of a filling material or the like.

In an alternative embodiment, the openings in the first component are in the form of blind holes from the inside of the first component, in which case, independently of the manner of implementation of the openings, the tie elements are connected to the cross-bolts, extend through the L-flange and are secured thereto.

The material thickness of the first component in the region of the openings is crucial for the way in which the openings are made. To provide for reliable load transfer a predetermined minimum contact area is required for the cross-bolts, and that area determines the necessary depth of each opening. If the material is not thicker or is relatively thin, the arrangement involves a through hole which then has to be covered over at the rotor blade surface. If the material is thicker or is relatively thick, a blind hole is sufficient so that there is no need for the rotor blade surface to be subsequently processed.

To make use of the economically advantageous rotor blade there is provided a wind power installation having at least one such rotor blade.

BRIEF DESCRIPTION OF THE SEVERAL VIEWS OF THE DRAWINGS

A preferred embodiment by way of example of the present invention is described more fully with reference to the accompanying figures in which:

FIG. 3 shows a simplified side view of the connection between the first and second components according to one embodiment, FIG. 4 shows a plan view of the connection between the first and second components according to one embodiment.

DETAILED DESCRIPTION

Figure 1:
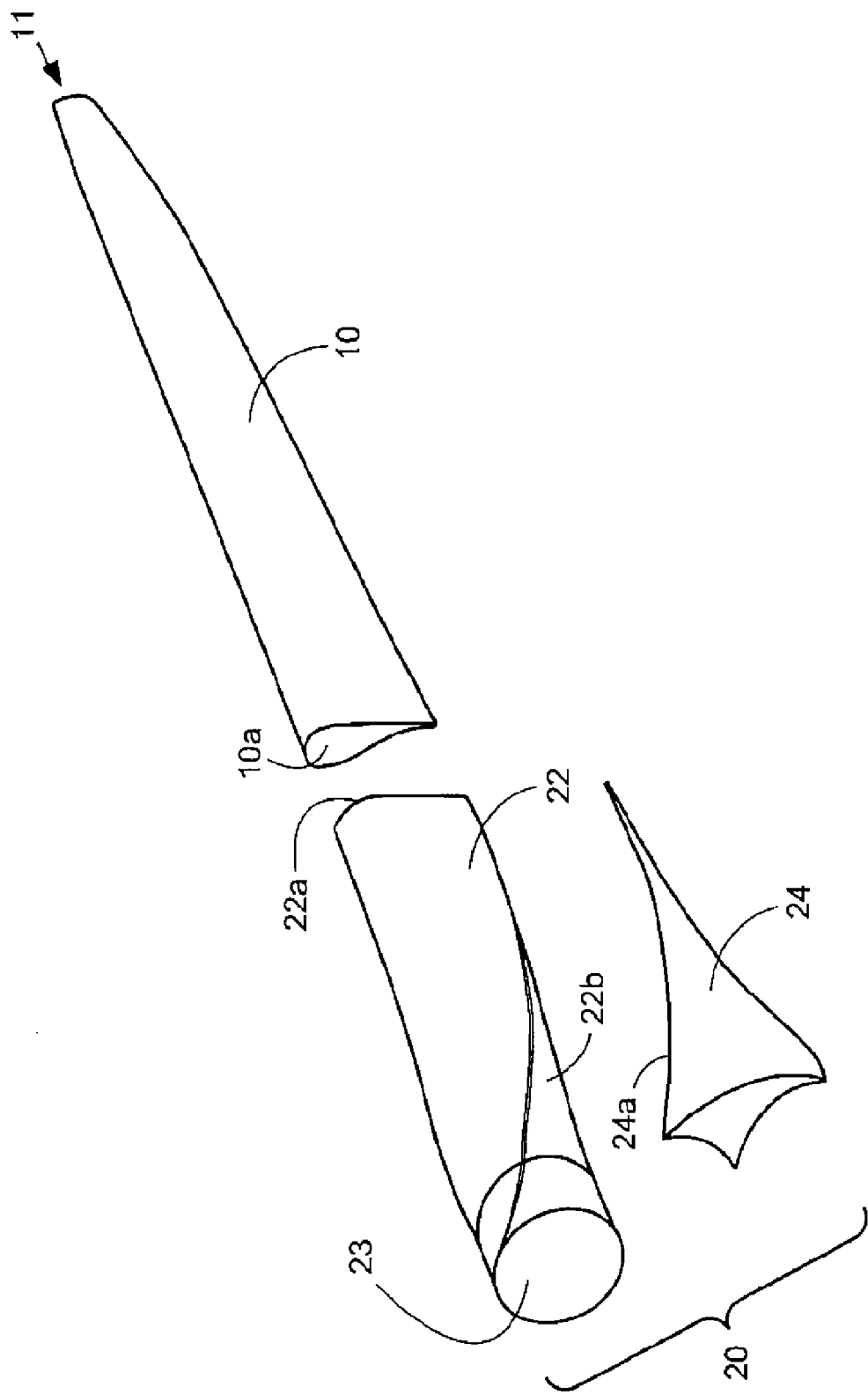
FIG. 1 shows an exploded view of a rotor blade according to one embodiment.

The exploded view in FIG. 1 shows a first component 10 (which includes the rotor blade tip 11) and a second component 20. The second component 20 is formed from two parts, namely a load-bearing part 22 which also includes the rotor blade root 23 for fixing the rotor blade to the rotor hub (not shown), and a blade trailing edge box 24. The load-bearing part 22 has a first connecting or contact face 22a and a second connecting or contact face 22b. The first connecting or contact face 22a serves to connect the load-bearing part 22 to the first component or the connecting or contact face 10a of the first component. The second connecting or contact face 22b serves to connect the load-bearing part 22 to the blade trailing edge box 24. Corresponding contact or connecting faces, that is to say on the one hand the contact or connecting face 22a and on the other hand the contact or connecting face 10a, are so adapted to each other that the load-bearing part 22 and the first component 10 can be substantially seamlessly fixed together. A corresponding consideration applies for the connecting or contact faces 22b and 24a.

Figure 2:
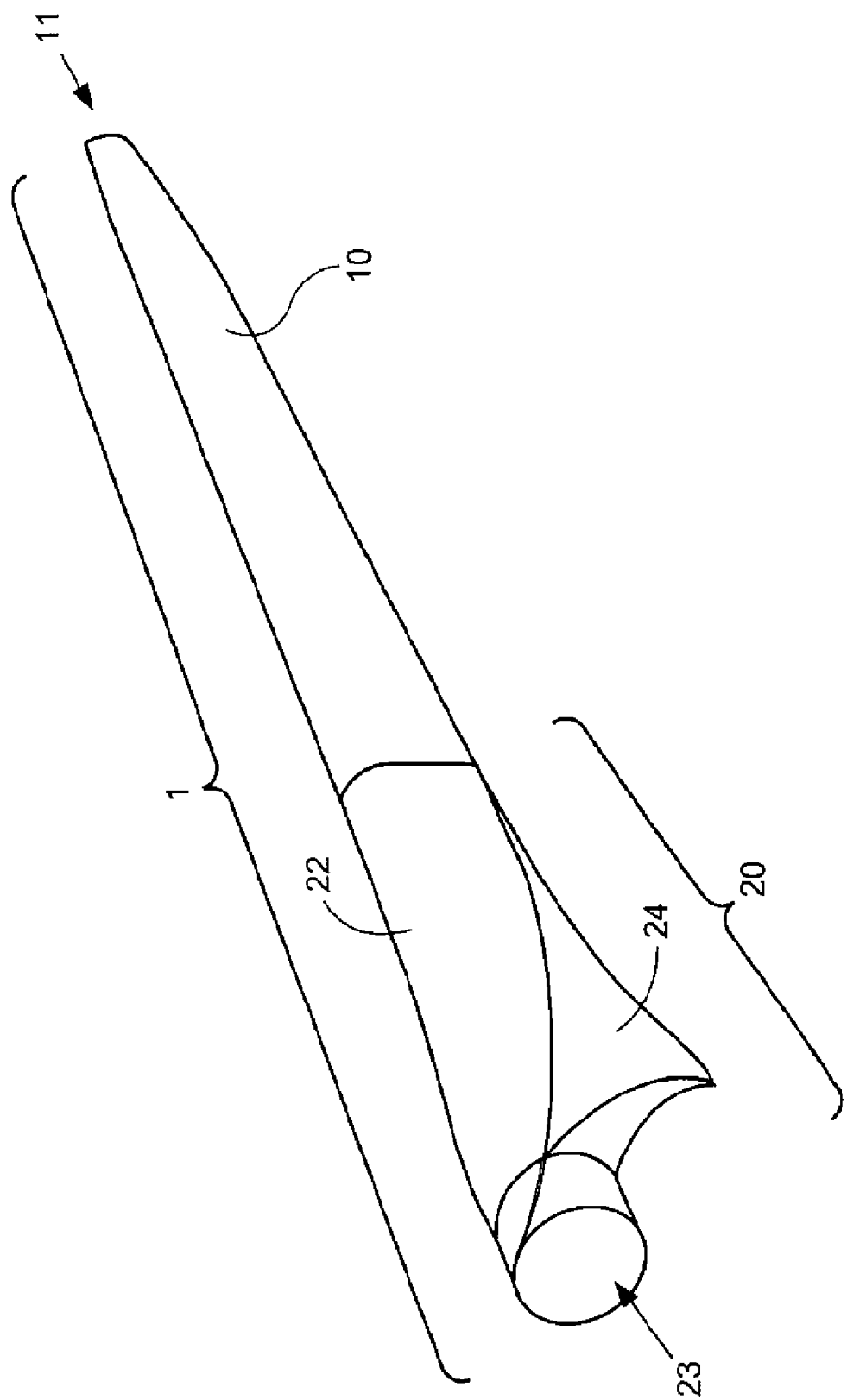
FIG. 2 shows a view of a rotor blade according to one embodiment in the assembled condition.

FIG. 2 shows the rotor blade 1 according to one embodiment in the assembled condition. In this case, the first component 10 and the second component 20 (which is assembled from the parts 22 and 24) form the rotor blade which is identified generally by reference 1.

Account is taken of the different demands on the components and the parts thereof, by the choice of different materials. Thus preferably, fiber-reinforced synthetic resin is used for the first component 10 (including the rotor blade tip 11) while steel is preferably used for the load-bearing part 22 of the second component 20 (including the blade root 23) and aluminum is used for the part or parts of the blade trailing edge box 24. Thus the required strength can be imparted to the load-bearing part 22 by working processes which have long been known and which are reliably managed in steel processing. As the second component 20 is that which includes the rotor blade root 23 which in the assembled rotor blade 1 forms the inner region near the rotor hub, no particularly high demands are placed on the aspect of accuracy of the shape thereof. The relatively high modulus of elasticity of steel also means that there is no need for additional material otherwise required for transmission of the loads which occur from the rotor blade 1. The situation is different, for example, with glass fiber-reinforced plastic material (GRP) as the material for the second component. Here, it would be necessary to use more material than is actually required to provide a structure that is stable in respect of shape to achieve the flexural stiffness required for load transfer. Because steel has a modulus of elasticity which is about 5 times higher than GRP, that additional reinforcement and the complication and expenditure that is inevitably involved therewith is not required.

The first component 10 (including the rotor blade tip 11) forming the outer part of the rotor blade 1 must in contrast be produced with a high level of accuracy in respect of shape as that component quite predominantly determines the aerodynamic properties of the rotor blade 1. Production processes using fiber-reinforced synthetic resins have been known for that purpose for many years so that components with a high level of accuracy in respect of shape and at the same time low weight (but in return at higher material costs than steel) can also be produced in mass production. It is appreciated that it is also possible to use a different material of comparatively low weight, like aluminum, for the first component 10. The low weight of the first component 10 results in correspondingly low loads which act overall on the second component 20 and the wind power installation. By way of example, mention may be made here of the rotationally cyclical loads due to the effect of gravity.

FIG. 3 shows how a connection between the first component 10 and the second component 20 or the contact face 10a and the contact face 22b can be made.

Provided in the first component 10 are what are referred to as blind holes, that is to say openings which do not pass completely through the material. A cross-bolt 12 is fitted into such an opening. A tie element 14, for example a screwthreaded rod, is connected to that cross-bolt 12, the length of the tie element 14 being such that it protrudes from the first component 10 to such an extent that the second component 20 can be fitted thereon and a screw connection is possible.

As the second component 20 has an L-flange 26 directed inwardly of the rotor blade, it can be seen from FIG. 3 that the cross-bolt 12 is also fitted into the opening from the interior of the rotor blade. As a result the outside of the rotor blade remains intact and thus aerodynamically clean.

As can further be seen from FIG. 3, the two components 10, 20 of the rotor blade are joined together by a nut 16 being fitted on to the screwthread on the tie element 14 that protrudes from the L-flange 26 of the second component 20.

To provide for more advantageous load transfer from the L-flange 26 to the second component 20, knee gusset plates 48 can be provided at predetermined spacings.

FIG. 4 shows a plan view of the connection between the first component 10 and the second component 20. Shown here once again are the cross-bolts 12 to which there are connected tie elements 14 which pass through the L-flange 26 of the second component 20 and are secured thereto with nuts 16 so as to afford a firm and fixed connection between the two components 10, 20.

It can further be seen from FIG. 4 that a respective knee gusset plate 28 is provided between two adjacent tie elements 14 so that those knee gusset plates 28 are distributed over the entire inside periphery of the rotor blade and thus promote uniform load transfer.

Figure 5:
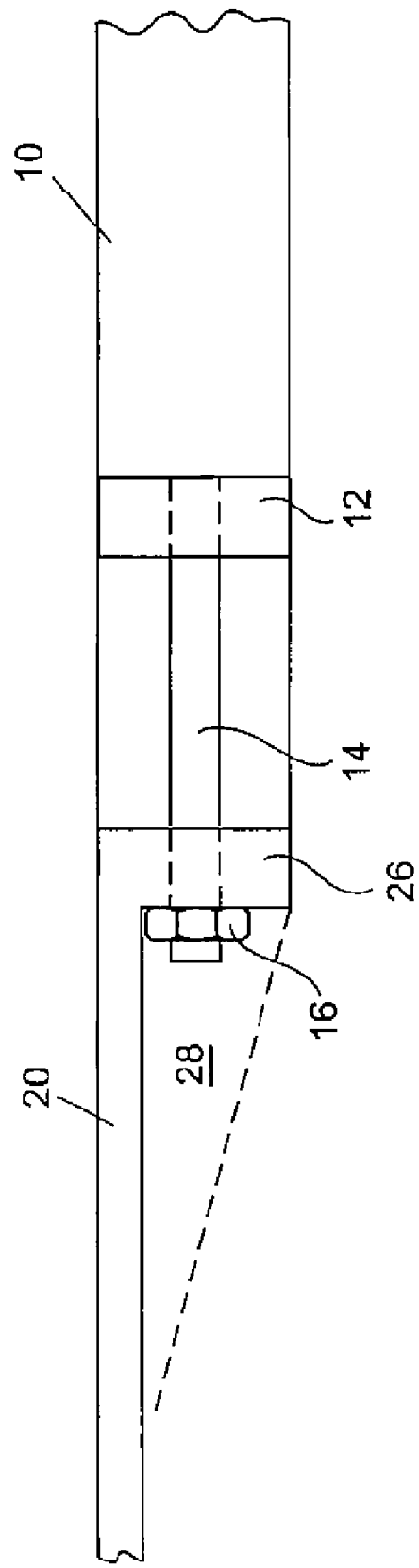
FIG. 5 shows an alternative embodiment of the connection shown in FIG. 3.

FIG. 5 shows an alternative embodiment of the connection shown in FIG. 3. The difference between the two figures is substantially that FIG. 5 shows through holes in place of the blind holes shown in FIG. 3. The other parts are identical and are denoted by the same reference characters as in FIG. 3. The description is therefore not repeated here and in that respect attention is directed to the description relating to FIG. 3.

The above-described rotor blades are preferably used as rotor blades of a wind power installation, the wind power installation preferably having three of those rotor blades.

In accordance with a further embodiment, the rotor blade trailing edge boxes 24 and the first component 10 (including the rotor blade tip 11) can be of different dimensions. In this respect, however, care should be taken to note that the connecting or contact faces 10a, 24a of the first component 10 (including the rotor blade tip 11) and the blade trailing edge box 24 remain the same, even with different dimensions for the first component 10 (including the rotor blade tip 11) and the trailing edge box 24, so that the respective and the different first components 10 (including rotor blade tips 11) and blade trailing edge boxes 24 can be fixed to the load-bearing part 22. It is possible to ensure in that way that a rotor blade for a wind power installation can be constructed in a modular structure based on the load-bearing part 22 and with first components 10 (including rotor blade tips 11) and rotor blade trailing edge boxes 24 of differing configurations. The respective rotor blade can thus be easily adapted to the operating conditions to be expected. It is thus possible to produce rotor blades of differing length and width and of different geometrical dimensions, wherein the load-bearing part 22 remains unchanged and only the first component 10 (including the rotor blade tip 11) and the blade trailing edge box 24 have to be appropriately adapted. It is thus possible to achieve inexpensive production of the load-bearing part 22 as that part is of an identical configuration for a multiplicity of different rotor blades.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A rotor blade for a wind power installation, comprising:
at least a first component and a second component, wherein the first component has a rotor blade tip and the second component has a rotor blade root, and the first and the second components are separate parts which jointly form the rotor blade, wherein the first component has a first material,
wherein the second component has at least a first and a second part which are in the form of separate parts and jointly form the second component,
wherein the first part represents a load-bearing part and the second part represents a blade trailing edge box,
wherein the first part comprises a second material and the second part a third material,
wherein there are provided fiber-reinforced synthetic resin as the first material, steel as the second material for the load-bearing part of the second component and aluminum as the third material for the part or parts of the blade trailing edge box,
wherein a connection between the first and second components of the rotor blade is a butt joint, and connecting elements for bridging over a joint gap of the butt joint are arranged exclusively within the rotor blade, and
wherein the connecting elements have cross-bolts, tie elements and an L-flange directed inwardly of the rotor blade on the second component, the cross-bolts are received in openings in the first component, and the tie elements are connected to the cross-bolts, extend through the L-flange, and are fixed there.

2. A rotor blade according to claim 1 wherein a length of the first component approximately corresponds to from ⅝ to ½ of a length of the overall rotor blade and a length of the second component corresponds to approximately from ⅙ to ½ of the length of the overall rotor blade.

3. A rotor blade according to claim 1 wherein at least the load-bearing part of the second component is adapted to accommodate a person without undergoing permanent deformation.

4. A rotor blade according to claim 1 wherein the openings in the first component for receiving the cross-bolts are in the form of blind holes from the inside of the first component.

5. A wind power installation comprising at least one rotor blade according to claim 1.

6. A rotor blade according to claim 1
wherein the rotor blade is of a modular structure and wherein rotor blade tips of different dimensions can be fixed to the load-bearing part and/or blade trailing edge boxes of differing dimensions on the load-bearing part.

7. A rotor blade according to claim 6 wherein the rotor blade tips have a previously defined contact face even in relation to different geometrical configurations, and
wherein the rotor blade trailing edge boxes have a previously defined contact face even with different dimensions.

8. A rotor blade according to claim 6
wherein a connecting face of the rotor blade tip is adapted to a first connecting face of the load-bearing part, and wherein a contact face of the blade trailing edge box is adapted to a second connecting face of the load-bearing part.

9. A rotor blade for a wind power installation, comprising:

at least a first component and a second component, wherein the first component has a rotor blade tip and the second component has a rotor blade root and the first component and the second component are separate parts adapted to jointly form the rotor blade, and wherein the first component comprises fiber-reinforced synthetic resin and the second component includes at least a steel load-bearing part and an aluminum blade trailing edge box, wherein a connection between the first component and the second component of the rotor blade is a butt joint, and connecting elements for bridging over the butt joint are arranged exclusively within the rotor blade, and wherein the connecting elements include cross-bolts, tie elements and an L-flange directed inwardly of the rotor blade on the second component, and the cross-bolts are received in openings in the first component and the tie elements are connected to the cross-bolts and extend through the L-flange.

10. A rotor blade according to claim 9 wherein a length of the first component approximately corresponds to from ⅚ to ½ of a length of the overall rotor blade.

11. A rotor blade according to claim 9 wherein at least the load-bearing part of the second component is adapted to accommodate a person without undergoing permanent deformation.

12. A rotor blade according to claim 11 wherein the openings in the first component for receiving the cross-bolts are blind holes on the inside of the first component.

13. A rotor blade for a wind power installation, comprising:

an interchangeable first component having a rotor blade tip; and a second component having a rotor blade root, wherein the first component and second component are separate parts adapted to jointly form the rotor blade, wherein the second component has at least a load-bearing part and an interchangeable blade trailing edge box, and wherein the load-bearing part of the second component of the rotor blade is of a modular structure adapted to interchangeably receive other first components having rotor blade tips of different dimensions and other blade trailing edge boxes of different dimensions, wherein the load-bearing part of the second component includes a first connecting face for receiving the other first components having rotor blade tips of different dimensions and a second connecting face for receiving the other blade trailing edge boxes of different dimensions.

\* \* \* \* \*